United States Patent [19]

Travis

[11] Patent Number: 4,576,480
[45] Date of Patent: Mar. 18, 1986

[54] OPTICAL ALIGNMENT SYSTEM

[75] Inventor: Alan J. B. Travis, Abingdon, England

[73] Assignee: United Kingdom Atomic Energy Authority, London, England

[21] Appl. No.: 514,594

[22] Filed: Jul. 18, 1983

[30] Foreign Application Priority Data

Jul. 26, 1982 [GB] United Kingdom ............... 8221520

[51] Int. Cl.$^4$ .................... G01B 11/26; B23K 9/00
[52] U.S. Cl. ............... 356/152; 219/121 LU; 356/153
[58] Field of Search ................. 356/152, 153; 219/121 LU, 121 LW, 121 LX, 121 LV

[56] References Cited

U.S. PATENT DOCUMENTS

| | | | |
|---|---|---|---|
| 3,723,013 | 3/1973 | Stirland et al. | 356/152 |
| 3,851,974 | 12/1974 | Ravussin et al. | 356/153 |
| 3,902,036 | 8/1975 | Zaleckas | 219/121 LM |
| 3,918,814 | 11/1975 | Weiser | 356/153 |
| 4,146,329 | 3/1979 | King et al. | 356/152 |
| 4,470,698 | 9/1984 | Green, Jr. et al. | 356/152 |

Primary Examiner—Stephen C. Buczinski
Assistant Examiner—Linda J. Wallace
Attorney, Agent, or Firm—William R. Hinds

[57] ABSTRACT

An optical alignment system in which an aligning beam of radiation is caused to scan around the periphery of an alignment aperture. Light reflected from the edge of the alignment aperture is collected and a related electrical signal is produced. If the alignment aperture is accurately centered with respect to the motion of the aligning beam, then the electrical signal will be constant. Any lack of centralization will cause variations in the electrical signal. The amplitude and phase of these variations relative to the motion of the aligning beam are indicative of the direction and amount of the decentralization of the alignment aperture with respect to the aligning beam. Hence these parameters are measured and used to operate a servo mechanism which is arranged to move the alignment aperture to centralize it with respect to the aligning beam.

The alignment aperture may form part of an optical system, or be attached to a piece of equipment the alignment of which it is desired to maintain.

10 Claims, 1 Drawing Figure

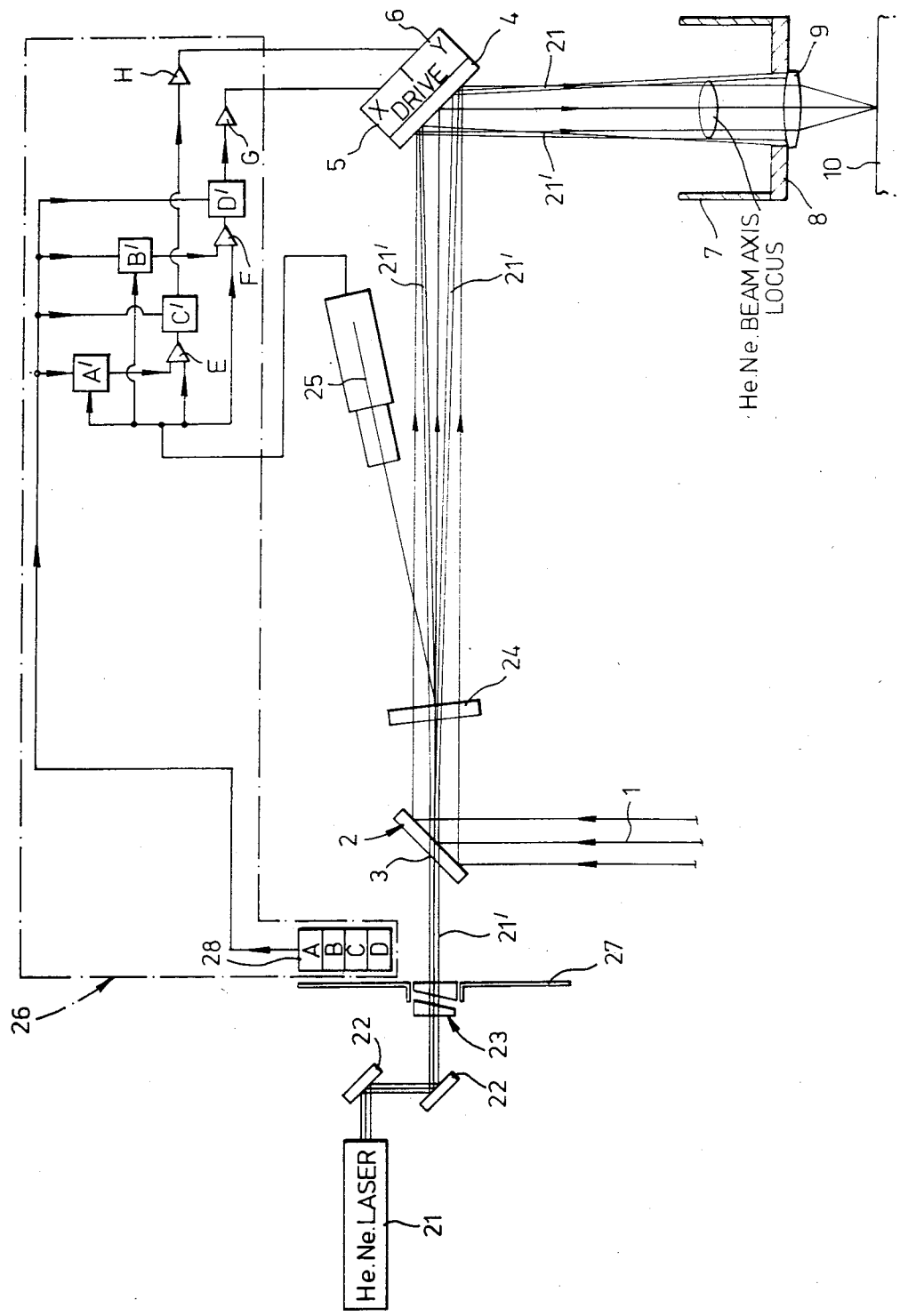

4,576,480

OPTICAL ALIGNMENT SYSTEM

The present invention relates to an optical alignment system, and more specifically, to an optical system for ensuring that a beam of laser radiation passes accurately through the optical centre of a focusing system.

For many purposes it is necessary to ensure that equipment maintains its alignment in a given direction even though it is subject to perturbing factors. For example, in connection with laser processing operations, it is necessary to ensure that a beam of radiation passes through the optical centre of a focusing system even though that focusing system may be moved to trace out a path corresponding to a cutting or welding operation.

Failure to ensure this can have harmful effects on the beam cross-sectional energy profile as well as distorting the focused beam spot.

According to the present invention there is provided an optical alignment system comprising means for projecting an alignment beam of radiation along a path which forms part of an optical system including an alignment aperture, means for causing the alignment beam to scan around the periphery of the alignment aperture, means for receiving light returned from the periphery of the alignment aperture and producing an electrical signal related to the intensity thereof, means for determining the amplitude and phase of the electrical signal relative to those of the motion of the alignment beam around the periphery of the alignment aperture and producing an alignment signal, and a servo mechanism adapted to respond to the alignment signal so as to bring the axis of the motion of the alignment beam and the centre of the alignment aperture into coincidence.

The alignment aperture may comprise the mounting for an imaging lens, or mirror, which forms part of another optical system such as a laser processing system, in which case the servo mechanism can be made to control the motion about two perpendicular axes of a mirror which is common to the optical alignment system and the laser processing system.

Alternatively, the alignment aperture could be attached to a piece of apparatus the orientation of which it is desired to maintain in a given direction and the servo mechanism can be made to move the piece of apparatus to maintain the desired orientation.

The invention will now be described, by way of example, with reference to the accompanying drawing, which is a diagrammatic representation of a laser processing system embodying the invention.

Referring to the drawing, there is shown a carbon dioxide laser processing system incorporating an optical alignment system according to the present invention which is arranged to ensure that the carbon dioxide laser beam passes centrally through a focusing lens. A laser beam 1, from a source which is not shown, is reflected from a beam mixing mirror 2 which has a central orifice 3 to a mirror 4, which is arranged to be moved about two mutually perpendicular axes by means of drive units 5 and 6. The laser beam 1 then passes to a focusing head 7 which incorporates an alignment aperture 8 and a focusing lens 9 which is arranged to bring the laser beam 1 to a focus at the surface of a workpiece 10.

The optical alignment system consists of a helium neon laser source 21 which provides an alignment beam 21', two beam folding mirrors 22, a rotating wedge assembly 23, driven by an electric motor which is not shown, a viewing element 24, a telescope with a photomultiplier unit 25, and a servo-mechanism control unit 26 indicated generally by the dotted line, which actuates the drives 5 and 6 of the mirror 4, which is common to both the laser processing system and the optical alignment system. Included in the rotating wedge assembly 23 is a position encoding system consisting of a rotating plate 27 which carries one component of the rotating wedge assembly 23 and has four regularly spaced position marks which are observed by four sample and hold timing detectors 28 (labelled A, B, C and D). The signals from the timing detectors 28 are applied to respective sample and hold circuits A', B', C' and D' within the servo mechanism control unit 26. Signals from the photomultiplier 25 also are applied to the sample and hold circuits A', B', C' and D'. The signals from the photomultiplier 25 are applied to the sample and hold circuits A' and B' directly and to the sample and hold circuits C' and D' via differential amplifiers E and F. The output from the sample and hold circuit A' also is applied to the differential amplifier E, and that from the sample and hold circuit B' also is applied to the differential amplifier F. The output from the sample and hold circuit D' is amplified by an amplifier G and used to actuate the X drive unit 5 of the moveable mirror 4, and the output from the sample and hold circuit C is amplified by an amplifier H and used to actuate the Y drive unit 6 of the moveable mirror 4.

The operation of the system is as follows: The alignment beam 21' is caused to pass centrally through the hole 3 in the beam mixing mirror 2 by means of suitable adjustments of the mirrors 22 so as to be generally coaxial with the main laser beam 1 and proceed along an identical path. The rotating wedge assembly 23 is then inserted. The deflection produced by the rotating wedge assembly is arranged to be such that the alignment beam 21' falls on the edge of alignment aperture 8 when the main laser beam 1 passes centrally through the focusing lens 9. The rotating wedge assembly 23 is then set in motion so as to cause the alignment beam 21' to scan around the periphery of the alignment aperture 8. Light returning from the periphery of the alignment aperture 8. is reflected from the viewing element 24 into the telescope and photomultiplier unit 25. The viewing element 24 is made of a material which is transparent to the $CO_2$ radiation in the main laser beam 1 and also has a high, but not perfect, transmittance for the He/Ne radiation in the alignment beam 21'. It is for this reason that a photomultiplier is necessary. Once the main and alignment laser beams 1 and 21' respectively have been set up accurately by adjusting mirror 2, any misalignment between the main laser beam 1, the alignment aperture 8 and the focusing lens 9 will cause the alignment beam 21' to overlap, at least partly, the edge of the alignment aperture 8 over a portion of its path, thus causing a fluctuation in the output signal from the photomultiplier unit 25. The amplitude of the fluctuation is a measure of the degree of misalignment and its phase is an indication of the direction in which the misalignment has occurred. The output signal from the photomultiplier unit 25 is sampled four times during each scan of the alignment beam 21'. The appropriate moments for sampling the output signal from the photomultiplier 25 are derived from the marks on the rotating plate 27 which forms part of the rotating wedge assembly 23 by the timing detectors 28. The sampled signals are paired, one pair for each axis of motion of the mirror 4. The difference between the sampled signals in each pair gives an error signal for each axis which, when amplified by the amplifiers G and H are applied to the drive units 5 and 6 of the moveable mirror 4 to cause it to move in the manner required to bring the axis of the motion of the alignment beam 21', and hence the main beam into the centre of the focussing lens 9.

I claim:

1. An optical alignment system comprising means for projecting an alignment beam of radiation along a path which forms part of an optical system including a mobile element having an alignment aperture, means for causing the alignment beam to scan around the periphery of the alignment aperture, means for receiving light returned from the periphery of the alignment aperture and producing an electrical signal related to the intensity thereof, means for determining the amplitude and phase of the electrical signal relative to those of the motion of the alignment beam around the periphery of the alignment aperture and producing an alignment signal, and a servo mechanism adapted to respond to the alignment signal so as to bring the axis of the motion of the alignment beam and the center of the alignment aperture into coincidence.

2. An optical alignment system according to claim 1 wherein the optical system is a laser processing system in which a main laser beam is arranged to be directed through the optical system coaxially with the alignment beam and leave the optical system through an exit operation which is coaxial with the alignment aperture.

3. An optical alignment system according to claim 2 wherein the alignment aperture comprises a mounting for an optical element which forms part of the exit operation of the optical system.

4. An optical alignment system according to claim 1 wherein the servo mechanism is arranged to control the motion about two perpendicular axes of a movable mirror which is common to the optical alignment system and the said optical system.

5. An optical alignment system according to claim 1 wherein the mobile element is attached to a piece of apparatus the orientation of which it is desired to maintain in a given direction, and the servo mechanism is adapted to move the piece of apparatus to maintain the desired orientation.

6. An optical alignment system according to claim 1 wherein the means for causing the alignment beam to scan around the periphery of the alignment aperture comprises an optical wedge assembly of transparent material arranged so as to deflect the alignment beam in a direction at an angle to the optical axis of the optical alignment system, and means for rotating the optical wedge assembly about an axis coincident with that of the optical alignment system.

7. An optical alignment system according to claim 6 wherein the rotating optical wedge assembly includes a position encoder whereby the azimuth of the displaced alignment beam relative to a reference position can be determined.

8. An optical alignment system according to claim 7 wherein the means for determining the amplitude and phase of the electrical signal related to the intensity of the light returned from the periphery of the alignment aperture relative to the motion of the alignment beam comprises a plurality of sample and hold circuits actuated by signals derived from the position encoder.

9. An optical alignment system according to claim 8 wherein the means for producing an alignment signal comprises means for deriving from the contents of a first group of sample and hold circuits a first component of the alignment signal indicative of displacements of the alignment beam in a first direction, and means for deriving from the contents of a second group of sample and hold circuits a second component of the alignment signal indicative of displacements of the alignment beam in a second direction at right angles to that of the first component.

10. An optical alignment system according to claim 9 wherein the servo mechanism is arranged to control the motion about two perpendicular axes of a movable mirror which is common to the optical alignment system and the said optical system, and the first and second directions correspond to the axes of motion of the movable mirror.

* * * * *